United States Patent [19]

Imoto et al.

[11] Patent Number: 5,712,941
[45] Date of Patent: Jan. 27, 1998

[54] RARE EARTH ELEMENT-DOPED MULTIPLE-CORE OPTICAL FIBER AND METHOD FOR FABRICATING THE SAME

[75] Inventors: Katsuyuki Imoto, Saitama; Kazuo Koya; Jun Abe, both of Gunma, all of Japan

[73] Assignees: Hitachi Cable, Ltd.; Shin-Etsu Chemical Co., Ltd., both of Tokyo, Japan

[21] Appl. No.: 658,074

[22] Filed: Jun. 4, 1996

[30] Foreign Application Priority Data

Dec. 11, 1995 [JP] Japan .................................. 7-321937

[51] Int. Cl.⁶ .................................................. G02B 6/02
[52] U.S. Cl. ........................... 385/126; 385/141; 385/123
[58] Field of Search .................................... 385/126, 125, 385/123, 124, 141–145

[56] References Cited

U.S. PATENT DOCUMENTS 5,570,448  10/1996  Imoto et al. .................... 385/123 X

FOREIGN PATENT DOCUMENTS

| 5-299733 | 11/1993 | Japan | H01S 3/07 |
| 5-345632 | 12/1993 | Japan | C03B 37/012 |
| 6-37385 | 2/1994 | Japan | H01S 3/17 |

OTHER PUBLICATIONS

English Language Abstract of Japanese Laid-Open *Application No. 5–299733*, publication date unknown. Patent date Nov. 1993.

English Language Abstract of Japanese Laid-Open *Application No. 5–345632*, publication date unknown. Patent date Dec. 1993.

English Language Abstract of Japanese Laid-Open *Application No. 6–37385*, publication date unknown. Patent date Feb. 1994.

*Primary Examiner*—Phan T. H. Palmer
*Attorney, Agent, or Firm*—Lowe, Price, LeBlanc & Becker

[57] ABSTRACT

A rare earth element-doped multiple-core optical fiber has an outer cladding layer and a plurality of cores each covered with a primary cladding layer. The cores are positioned substantially on a central axis of the outer cladding layer and separated with a predetermined spacing S from each other by the primary cladding layer. The outer cladding layers are made of $SiO_2$, or $SiO_2$ added with a dopant like F, Ge, etc. The primary cladding layer is made of $SiO_2$ doped with Er, or $SiO_2$ doped with Er and F together and formed to have a predetermined thickness of 1.0 μm~1.5 μm to form the predetermined spacing S. The Soot glass rods for cores and primary cladding layers are immersed in an Er-compound solution, then picked up, dried and consolidated to form Er—Al co-doped $SiO_2$—$GeO_2$ transparent glass rods. The glass rods are inserted into a quartz tube and collapsed by heat to fabricate an optical fiber preform rod, then heated to be drawn to provide an Er-doped multiple-core optical fiber.

15 Claims, 10 Drawing Sheets

RARE EARTH ELEMENT-DOPED MULTIPLE-CORE OPTICAL FIBER AND METHOD FOR FABRICATING THE SAME

FIELD OF THE INVENTION

This invention relates to a rare earth element-doped optical fiber, and more particularly to, a rare earth element-doped multiple-core optical fiber having a high gain and widely flat characteristics of gain to wavelength, and a method for fabricating the same.

BACKGROUND OF THE INVENTION

These days, an optical fiber amplifier using a rare earth element-doped optical fiber, which is doped with rare earth element such as Er, Pr, Nd, etc. into a core thereof, has been developed and improved for practice. Especially, an Er-doped optical fiber amplifier, which can provide a high gain and a high saturated output power at the 1.55 µm wavelength band, is expected to be applied to various optical systems. Its application to a high-speed, large-quantity, and long-distance optical transmission system using a wavelength division multiplexing transmission technique of more than several channels between 1.53 µm and 1.56 µm wavelength bands, and an optical CATV system, for example, has been noted. In such optical transmission systems, it is important that the Er-doped optical fiber amplifier has flat gain characteristic in such wavelength bands.

In order to realize such flat characteristics of gain to wavelength, an Er-doped multiple-core optical fiber and a method for fabricating the same have been proposed by the inventors. The optical fiber comprises plural cores doped with rare earth elements, such as Er and Al together, and an outer cladding layer which is provided around the cores, each of which is directly covered by a primary cladding layer. For this structure, the cores can contain much higher concentration of Al dopant than a single core of a conventional Er-doped optical fiber. Further more, gain of each core is to be lowered to obtain flat characteristics of gain to wavelength, then, high gain is provided by superposing all outputs thereof in addition to the flattened characteristics of gain to wavelength.

In an optical fiber amplifier using such a proposed Er-doped multiple-core optical fiber, however, the inventors have found disadvantages in that when a spacing among the cores of the optical fiber become larger, a gain is suddenly dropped, although flat characteristics of gain to wavelength in a wavelength band of 1.53 µm~1.57 µm is obtained.

SUMMARY OF THE INVENTION

Accordingly, it is an object of the invention to provide a rare earth element-doped multiple-core optical fiber, and a method for fabricating the same, by which a gain is high and widely flat characteristics of gain to wavelength is obtained.

It is a further object of the invention to provide a rare earth element-doped multiple-core optical fiber, and a method for fabricating the same, by which a less gain drop occurs even if a spacing among the cores becomes large.

It is a still further object of the invention to provide a rare earth element-doped multiple-core optical fiber, and a method for fabricating the same, by which an excitation light power becomes lower and a length of the optical fiber becomes shorter.

It is a still yet further object of the invention to provide a method for fabricating a rare earth element-doped multiple-core optical fiber, by which an rare earth element-doped multiple-core optical fiber having a high gain and wide wavelength band characteristics is fabricated precisely and economically.

According to the first feature of the invention, a rare earth element-doped multiple-core optical fiber, comprises:
a plurality of cores each having a refractive index of $n_w$, doped with at least one rare earth element and Al therein;
a plurality of primary cladding layers each having a refractive index of $n_p$ ($n_p < n_w$) doped with at least one rare earth element, and covering each of the cores; and
an outer cladding layer having a refractive index of $n_c$ ($n_w > n_c$ and $n_p \leq n_c$), and covering said plurality of cores covered with the plurality of primary cladding layers;
wherein the cores are positioned substantially on a central axis of the outer cladding layer, and separated with a predetermined spacing by the plurality of primary cladding layers.

According to the second feature of the invention, a rare earth element-doped multiple-core optical fiber, comprises:
a plurality of cores each having a refractive index of $n_w$, doped with at least one rare earth element and Al therein;
a plurality of intermediate cladding layers each having a refractive index of $n_I$ ($n_I < n_w$) doped with at least one rare earth element, and covering the plurality of cores;
a plurality of primary cladding layers each having a refractive index of $n_p$ ($n_p \leq n_I$ and $n_p < n_w$) doped with at least one rare earth element, and covering the plurality of intermediate cladding layers; and
an outer cladding layer having a refractive index of $n_c$ ($n_w > n_c \leq n_I \leq n_c$ and $n_p \leq n_c$), and covering the plurality of cores covered with the plurality of intermediate and primary cladding layers;
wherein the plurality of cores are positioned substantially on a central axis of the outer cladding layer, and separated with a predetermined spacing by the plurality of intermediate cladding layers.

According to the third feature of the invention, a method for fabricating a rare earth element-doped multiple-core optical fiber, comprises the steps of:
fabricating a plurality of soot glass rods, each of which is provided with a core containing Al and a primary cladding layer covering directly the core;
immersing the plurality of soot glass rods in an rare earth element-compound solution;
picking up the plurality of soot glass rods from the solution, and drying and consolidating them to provide a plurality of rare earth element and Al co-doped transparent glass rods;
inserting the plurality of co-doped transparent glass rods into a quartz tube;
heating and collapsing the quartz tube thus inserted with the plurality of co-doped transparent glass rods to fabricate an optical fiber preform rod; and
heating and drawing the optical fiber preform to provide an rare earth element-doped multiple-core optical fiber.

According to the forth feature of the invention, a method for fabricating a rare earth element-doped multiple-core optical fiber, comprises the steps of:
fabricating a plurality of soot glass rods, each of which is provided with a core containing Al and an intermediate cladding layer covering directly the core;
immersing the plurality of soot glass rods in a rare earth element-compound solution;
picking up the plurality of soot glass rods from the solution, drying and consolidating them to provide rare earth element and Al co-doped transparent glass rods;
covering each of the co-doped transparent glass rods by an primary cladding layer;

inserting the plurality of co-doped transparent glass rods with the intermediate cladding layers and the primary cladding layers into a quartz tube;

heating and collapsing the quartz tube to fabricate an optical fiber preform rod; and heating and drawing the optical fiber preform rod to provide an rare earth element-doped multiple-core optical fiber.

BRIEF DESCRIPTION OF THE DRAWINGS

The invention will be explained in more detailed in conjunction with the appended drawings, wherein.

DESCRIPTION OF THE PREFERRED EMBODIMENTS

Before explaining a rare earth element-doped multiple-core optical fiber in the first preferred embodiment, the aforementioned rare earth element-doped multiple-core optical fiber formerly proposed by the inventors, and a method for fabricating the same will be explained in FIG. 1.

The Er-doped optical fiber 1 comprises plural cores 2 seven cores in this case) doped with Er and Al together, and an outer cladding layer 4 which is provided around the cores 2, each of which is directly covered by a primary cladding layer 3.

Figure 5:
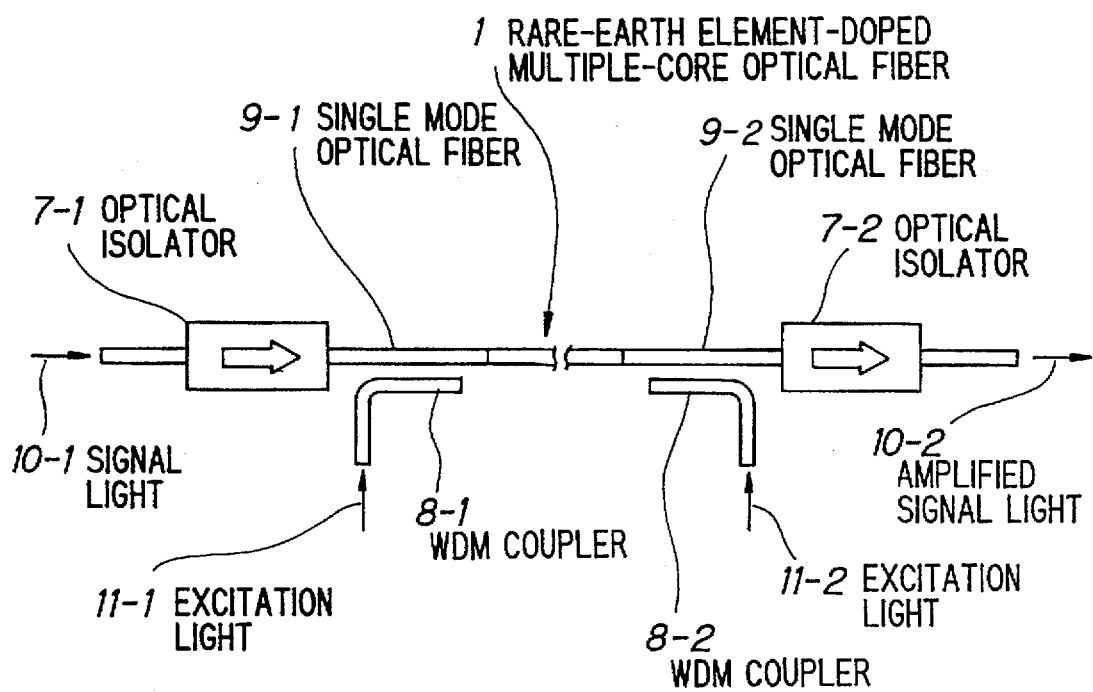
FIG. 5 is a structural view showing a rare earth element-doped multiple-core optical fiber amplifier in the invention.

FIG. 5 shows a rare-earth element-doped multiple-core optical fiber amplifier using such an optical fiber, which comprises a certain length of a rare-earth element-doped multiple-core optical fiber 1, light sources (not shown) for emitting excitation lights 11-1 and 11-2, to be injected through WDM couplers 8-1 and 8-2 into the optical fiber 1 at front and rear stages, respectively.

In operation, the excitation lights 11-1 and 11-2 are coupled with single mode optical fibers 9-1 and 9-2 through WDM couplers 8-1 and 8-2, then absorbed in the optical fiber 1 inherently to amplify a signal light 10-1 transmitted through the optical fiber 1 to obtain an amplified signal light 10-2. Optical isolators 7-1 and 7-2 are preferably used for suppressing a retrograde signal light of the amplified signal light 10-2.

Figure 3:
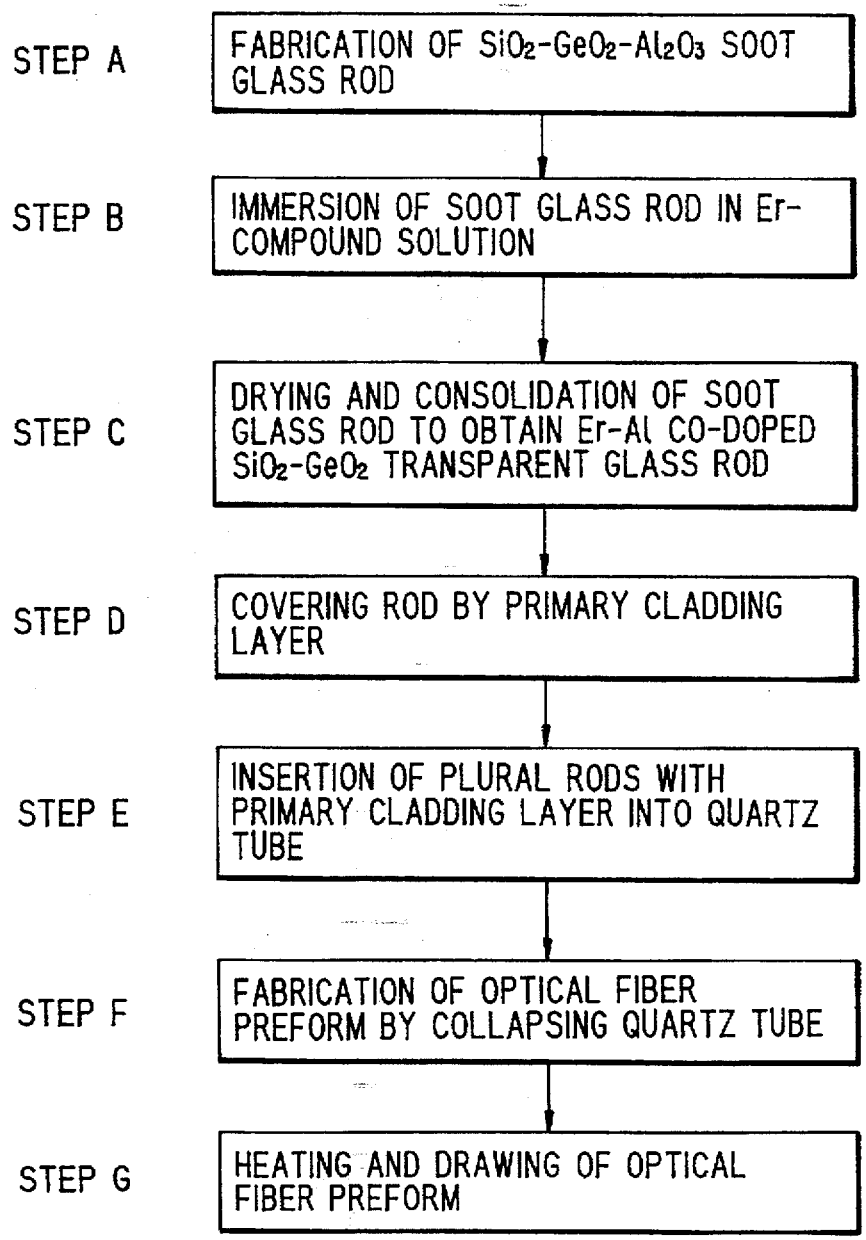
FIG. 3 is a flow chart showing a method for fabricating a rare earth element-doped multiple-core optical fiber which is formerly proposed by the inventors.

Next, now referring to FIG. 3, a method for fabricating an Er-doped multiple-core optical fiber proposed by the inventors will be explained below.

$SiO_2$—$GeO_2$—$Al_2O_3$ composite soot glass rods are fabricated by an ordinary fabrication process such as VAD method (at step A). Next, the soot glass rods are immersed in an Er-compound solution (at step B). Then the soot glass rods are picked up from the solution, dried and consolidated by an electrical heater to obtain Er—Al co-doped $SiO_2$—$GeO_2$ transparent glass rods (at step C). After that, each of the rods is covered by a primary cladding layer by an ordinary fabrication process such as outer CVD method (at step D), the plural rods with the primary cladding layers are inserted into a quartz tube (at step E), and the quartz tube is heated by oxyhydrogen-burner and collapsed to fabricate an optical fiber preform rod (at step F). Finally, the optical fiber preform is moved into an electric heater at a predetermined speed to be heated, an end of the fused rod is drawn out of the heater and wound around a drum to provide an Er-doped multiple-core optical fiber (at step G).

According to such structure of the Er-doped multiple-core optical fiber, as mentioned before, high gain is obtained as well as the flat characteristics of gain to wavelength. The reasons for this will be explained in more detail by the following.

First, the cores can contain much higher concentration of Al dopant than a single core in a conventional Er-doped optical fiber. Second, for this structure, though a gain of each core is to be lowered to obtain flat characteristics of gain to wavelength, then a high gain is provided by superposing all outputs thereof in addition to the flattened characteristics of gain to wavelength. The conventional characteristics of gain to wavelength show that an injected excitation light power is lowered, a peak of gain observed near 1.535 μm wavelength decreases, and gain relative to wavelength becomes flat gradually. As the excitation light power becomes lower, a right hand increasing tendency is observed, that is to say, the gain at a shorter wavelength band (1.53 μm wavelength side) becomes lower, and the gain at a longer wavelength band (1.56 μm wavelength side) becomes high. If the excitation light power is extremely lowered, the gain is too low to be used as an optical fiber amplifier. The Er-doped multiple-core optical fiber proposed by the inventors utilizes such principle actively. If an outer diameter D of the core 2, and a spacing S among the cores 2 is optimized so that an excitation light and an signal light are almost equally distributed and transmitted in each core, a gain of each core is low but a flat gain relative to wavelength is obtained. The signal lights, being transmitted through a certain length of the fiber, are amplified in each core, respectively, and superposed as an output signal. As a result, the gain is high, and the characteristics of gain to wavelength are flattened.

In such Er-doped multiple-core optical fibers, however, there is disadvantage as described below. The characteristics of gain to core spacing for optical fiber amplifiers using a variety of Er-doped multiple-core optical fibers have been measured. The result for an optical fiber amplifier which uses the optical fiber formerly proposed by the inventors having a core of approximately 2 μm diameter is indicated as "PRIOR EXAMPLE" in FIG. 4. The result shows that as the core spacing S(μ m) is increased, the gain G (dB) is drastically dropped, as described before, although the flat characteristics of gain to wavelength become wider in 1.53 μm~1.57 μm wavelength bands.

The reason for this is that optical isolators 7-1 and 7-12, and WDM couplers 8-1 and 8-2 are made from the same fiber as the single mode optical fibers 9-1 and 9-2, each of which is provided with, for example, a core of 10 μm diameter, a cladding layer of 125 μm diameter, and a specific refractive index difference of 0.3%. If the single mode optical fibers 9-1 and 9-2 are connected to both ends of the rare earth element-doped multiple-core optical fiber, a part of the signal lights and the excitation lights are transmitted through the primary cladding layer 3, in addition to being transmitted through the seven cores 2 co-doped with a rare earth element Er and Al. As a result, a power of such partial lights transmitted through each primary cladding layer 3 increases, as the core spacing S becomes larger. The inventors have studied this phenomenon and have found that no rare earth element is doped in each primary cladding layer to contribute to amplifying the signal light, so that the gain decreases as the core spacing S becomes larger.

Next, a rare earth element-doped optical fiber in a first preferred embodiment according to the invention will be explained by referring to FIG. 1.

In the first preferred embodiment, a rare earth element-doped multiple-core optical fiber 1 is provided with an outer cladding layer 4 having an approximately circular cross-section, and seven cores 2 having a predetermined diameter D, being positioned substantially on a central axis of the cladding layer so as to be separated with a predetermined spacing S from each other by a primary cladding layer 3. The outer cladding layers 4 are made of $SiO_2$, or $SiO_2$ added with a dopant for controlling their refractive indices, such as F, Ge, etc. and generally formed to have an outer diameter of approximately 125 μm. The primary cladding layer 3, which directly covers the core 2, is made of $SiO_2$ doped with Er, or $SiO_2$ doped with Er and F together, and formed to have a predetermined thickness so as to separate the cores 2 each other with a core spacing S of 1.0 μm~1.5 μm. A refractive index $n_p$ f the primary cladding layer 3 is to be lower than a refractive index $n_w$ f the core 2, and is equal to or lower than a refractive index nc of the outer cladding layer 4. It is preferable that the primary cladding layer 3 contains at lease 50 ppm of Er, and a profile of Er concentration, which will be explained later, may be varied along its thickness direction, or constant. Regarding to the concentration of Er dopant in the primary cladding layer, the higher it is, the more the Er dopant contributes to amplifying a signal light. However, its upper limit is determined not to exceed the Er concentration in the core 2.

Figure 1:
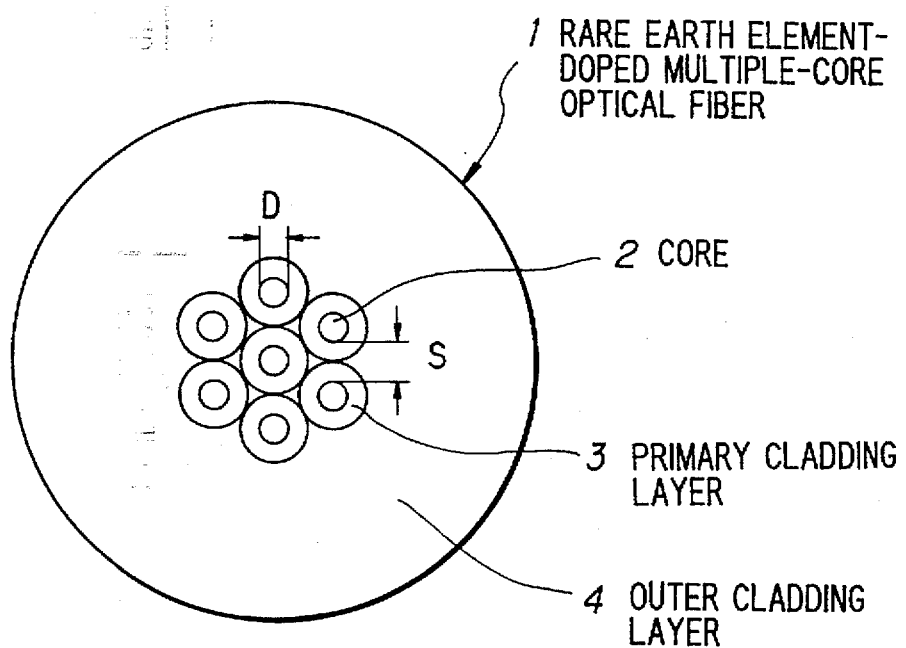
FIG. 1 is a cross-sectional view showing a rare earth element-doped multiple-core optical fiber in a first preferred embodiment according to the invention.
Figure 2:
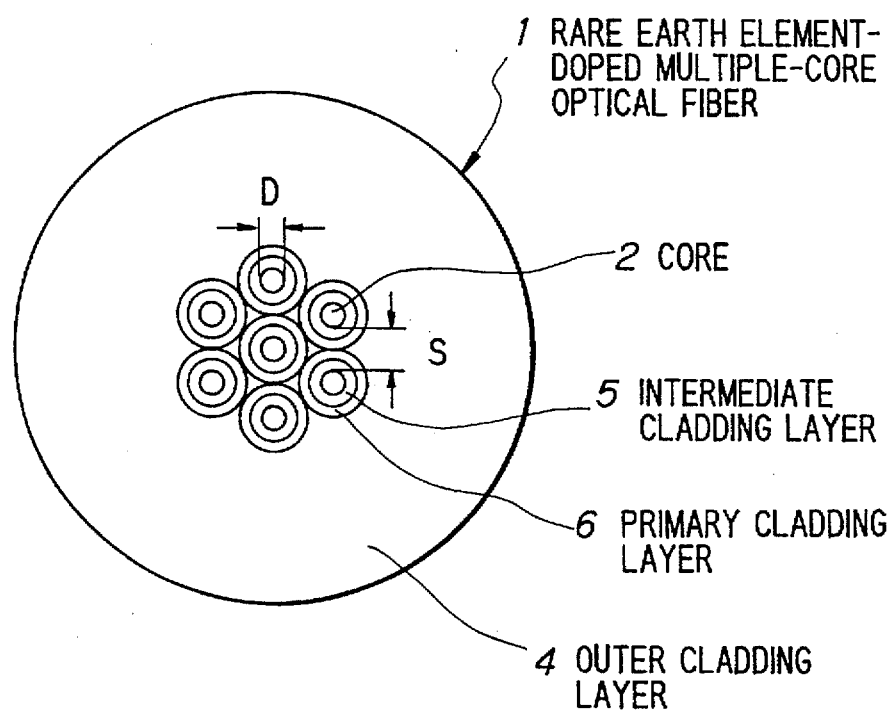
FIG. 2 is a cross-sectional view showing a rare earth element-doped multiple-core optical fiber in a second preferred embodiment according to the invention.

FIG. 2 shows a rare earth element-doped optical fiber in a second preferred embodiment according to the invention, wherein like parts are indicated by like reference numerals as used in FIG. 1. A rare earth element-doped optical fiber in the second preferred embodiment is provided with cores 2 each doped with Er and Al together, being directly covered by an intermediate cladding layer 5, and a primary cladding layer 6 containing no rare earth element dopant to cover the intermediate cladding layer 5 directly. A refractive index $n_p$ of the primary cladding layer 6 is to be lower than a refractive index $n_w$ of the core 2, but equal to or lower than a refractive index $n_c$ of the outer cladding layer 4, and equal to or higher than a refractive index $n_I$ of the intermediate cladding layer 5. The material used as the primary cladding layer 6 is different from that in the first preferred embodiment, which may includes $SiO_2$ without Er dopant, or $SiO_2$ doped with F, B, or Ge. The thickness thereof is predetermined to be much thinner than that of the intermediate cladding layer 5. The intermediate cladding layers 5 is made of $SiO_2$ doped with at least 50 ppm of Er, which may additionally contain F, so as to amplify a signal light transmitted through the layer. In the second preferred embodiment, a spacing S among the cores 2 is adjusted by controlling a thickness of the intermediate cladding layer 6. Regarding to the concentration of Er dopant therein, the higher it is, the more the Er dopant contributes to amplifying a signal light, but its upper limit is determined not to exceed the Er concentration in the core 2.

In the first and second preferred embodiments, a core diameter D is determined as one point something micrometer through two point something micrometer (1.x μm~2.y μm) so as to be substantially equal to a mode-field diameter of the single mode optical fibers to be connected, which is approximately 10 μm. A specific refractive index difference between the cores and the outer cladding layer, or between the cores and the primary cladding layers is at least 1%. Higher specific refractive index difference is preferable for a high gain amplification, and a maximum value may be approximately 2.5%, which is obtained by adding F into the outer cladding layer or the primary cladding layer. The material used as the cores may include Er-Al co-doped $SiO_2$, Er—Al co-doped $SiO_2$—$GeO_2$—$P_2O_5$, Er—Al co-doped $SiO_2$—$P_2O_5$, etc. and the concentration of Er dopant therein is at lease 200 ppm and may be increased up to approximately 1500 ppm. Higher concentration of Er is preferable for obtaining a high gain amplification and flat characteristics of gain to wavelength. It is also preferable that the concentration of Al dopant in the cores is at lease 7000 ppm and may be increased up to approximately 3.5% for obtaining flat characteristics of gain to wavelength. Besides Er, at least one of other rare earth elements such as Pr, Nd, Yb, Sm, Tm, Ce, etc. may be doped with Al into the cores.

Figure 6:
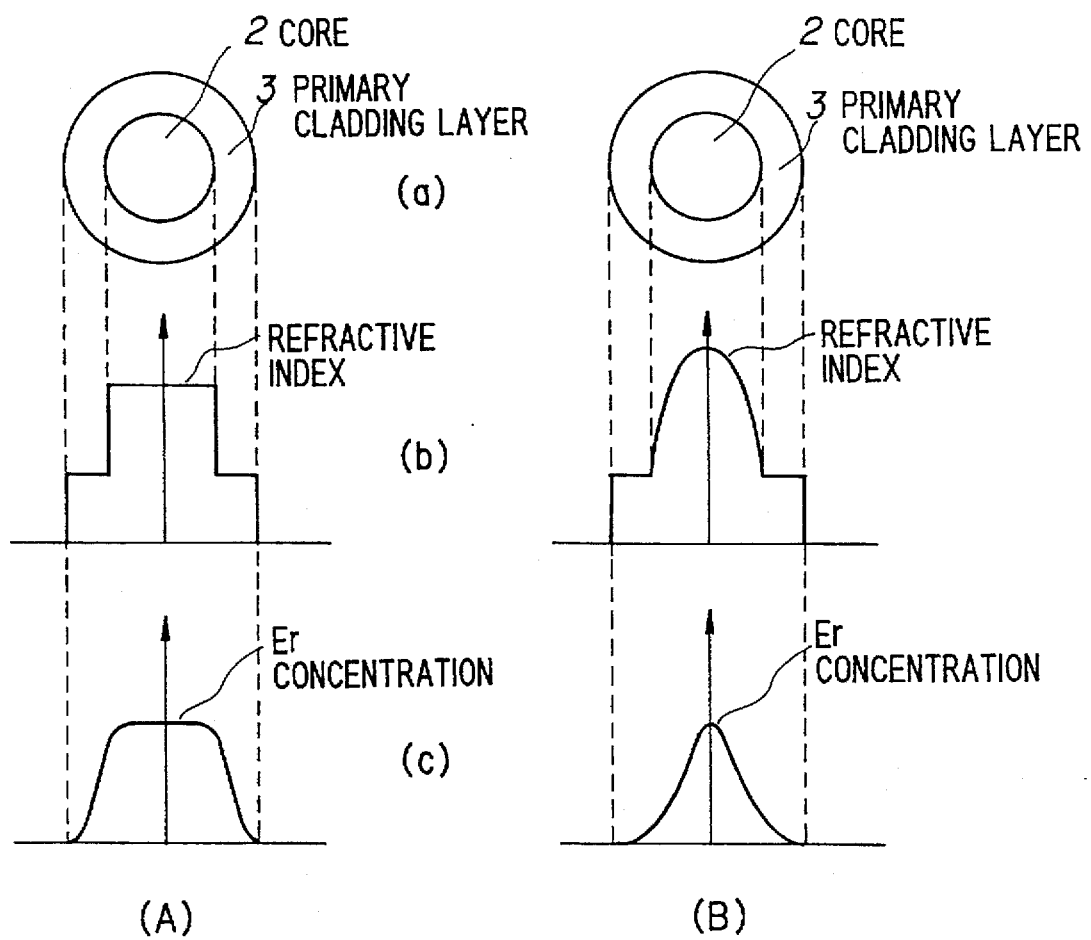
FIG. 6 is for sectional view showings (a) two types of cores covered by primary cladding layers of a rare earth element-doped multiple-core optical fiber in the first preferred embodiment according to the invention, their profiles (b) of refractive indices, and Er concentrations (c)

FIG. 6 shows two types (A) and (B) of cores covered by primary cladding layers of a rare earth element-doped multiple-core optical fiber in the first preferred embodiment according to the invention, wherein their enlarged cross-sectional views, their refractive index profiles, and Er concentration profiles are indicated by (a),(b), and (c), respectively. In type (A), it is provided with a core 2 having a constant refractive index to be higher than that of a primary cladding layer 3. An Er concentration therein has a quasi-step profile. In type (B), it is provided with a core 2 having a graded refractive index and an Er concentration therein has a nearly Gaussian distribution profile. Regarding to specific refractive index differences between cores 2 and primary cladding layers 3, approximately the same values may be obtained in type (A) and (B) by increasing the maximum value of refractive index in the core of type (B).

Figure 7:
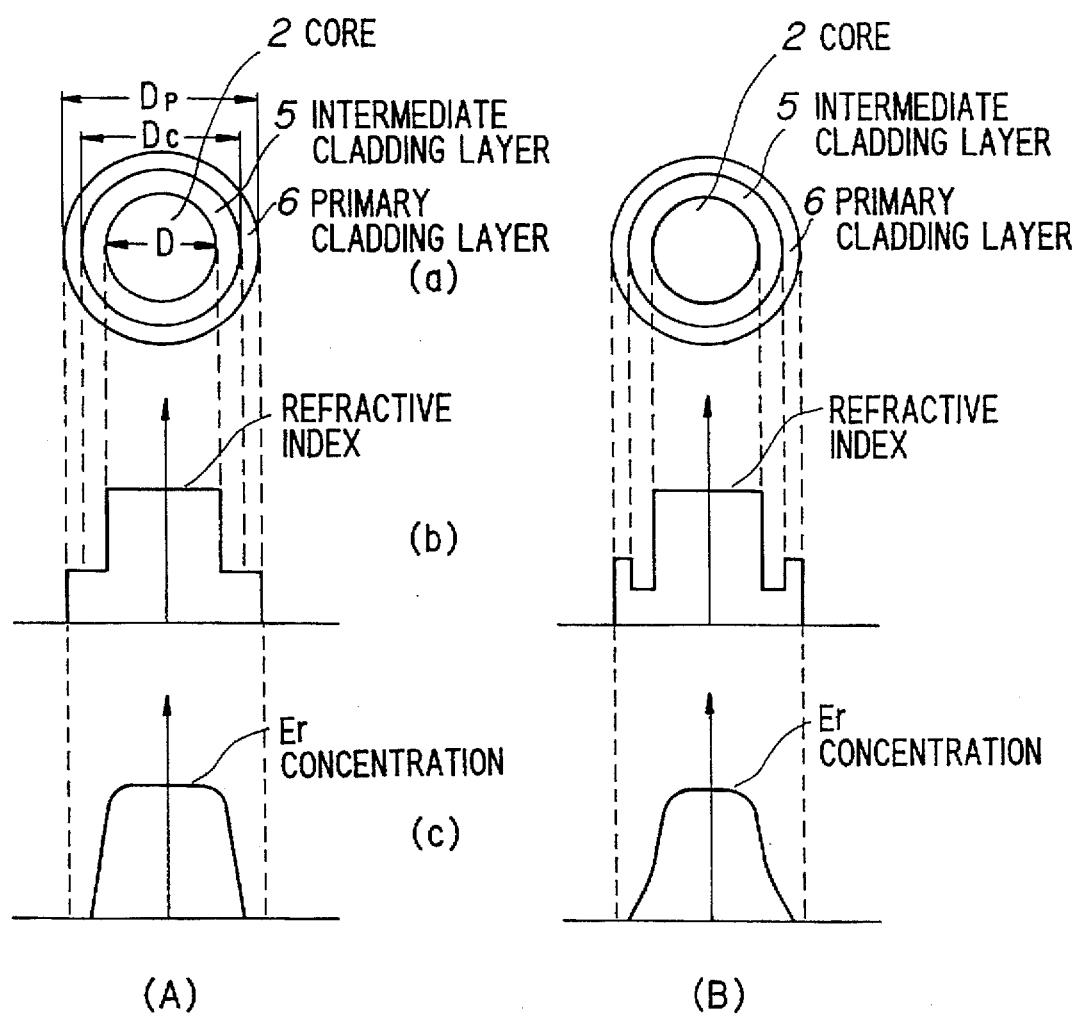
FIG. 7 is for sectional views (a) showing two types of cores covered by intermediate cladding layers and primary cladding layers of a rare earth element-doped multiple-core optical fiber in the second preferred embodiment according to the invention, their profiles (b) of refractive indices, and Er concentrations (c)

FIG. 7 shows two types (A) and (B) of cores covered by primary cladding layers of a rare earth element-doped multiple-core optical fiber in the second preferred embodiment according to the invention. In type (A), it is provided with a core 2 having a constant refractive index to be higher than those of an intermediate cladding layer 5 and a primary cladding layer 6, then, it shows a step index profile. An Er concentration therein has a quasi-step profile. In type (B), it is provided with a core 2 having a constant refractive index, and an intermediate cladding layer 5 having a refractive index to be lower than those of the core 2 and an primary cladding layer 6 to provide an approximately W-shaped refractive index profile. An Er concentration therein has a nearly Gaussian distribution profile.

In the invention, those refractive indices and Er concentration profiles are adjusted by controlling conditions such as time for immersing a soot glass rod in Er-compound solution, Er concentration of the solution, time for drying the soot glass rod after the immersion, time and temperature for consolidation, etc.

Next, a method for fabricating a rare earth element-doped multiple-core optical fiber in the first preferred embodiment according to the invention will be explained in FIG. 8. Soot glass rods comprising $SiO_2$—$GeO_2$—$Al_2O_3$ for cores and $SiO_2$ or $SiO_2$ doped with F for primary cladding layers are fabricated by an All-synthetic process such as VAD method (at step A). Next, the soot glass rods are immersed in an Er-compound solution (at step B). In this process, an immersion time is controlled so as to provide certain Er concentration profiles thereof, such as a step, a Gaussian distribution as shown in FIG. 6. Then the soot glass rods are picked up from the solution, dried and consolidated by an electrical heater to obtain Er—Al co-doped $SiO_2$—$GeO_2$ transparent glass rods with primary cladding layers (at step C). After that, plural rods with the primary cladding layers are inserted into a quartz tube (at step D). The quartz tube is vacuumed, heated by oxyhydrogen-burner from one end to another, and collapsed to fabricate an optical fiber preform rod (at step E). Finally, the optical fiber preform rod is moved into an electric heater at a predetermined speed to be heated, an end of the fused rod is drawn out of the heater and wound around a drum to provide an Er-doped multiple-core optical fiber (at step F).

Figure 8:
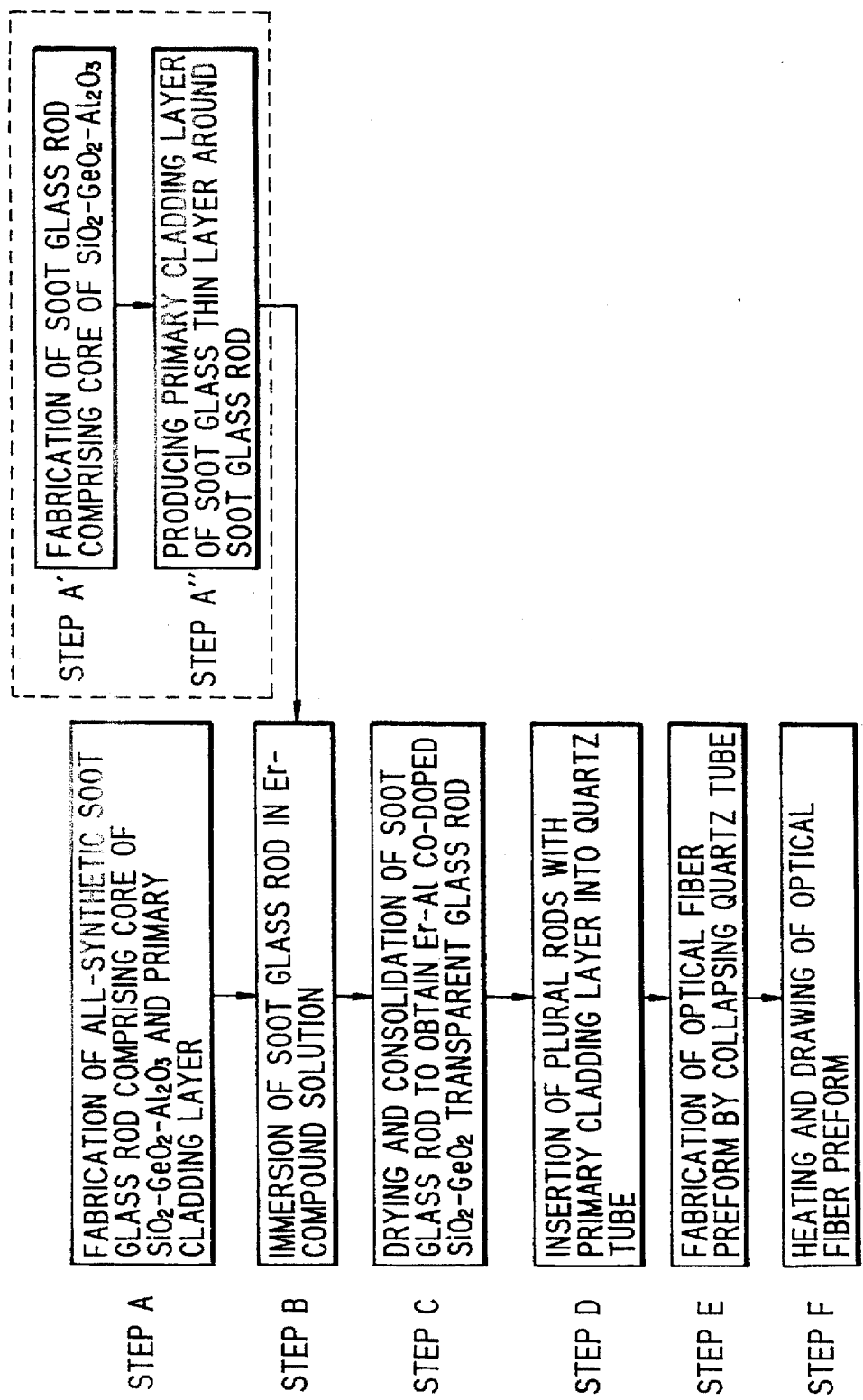
FIG. 8 is a flow chart showing a method for fabricating a rare earth element-doped multiple-core optical fiber in the first preferred embodiment according to the invention.

Besides step A, soot glass rods may be fabricated by two separate steps, that is to say, fabricating soot glass rods for Al-containing cores, such as SiO$_2$—GeO$_2$—Al$_2$O$_3$ cores (at step A'), then producing primary cladding layers of soot glass thin layers around the soot glass rods (at step A"), as encircled by a broken line in FIG. 8. Both steps may be processed by VAD method, and soot glass rods are fabricated by using two flame-hydrolysis-burners, which are positioned with a predetermined distance on the picking-up direction of the rods to provide an upper burner and a lower burner. Soot glass rods for cores and soot glass thin layers for primary cladding layers are produced by the upper and lower burners, respectively.

Figure 9:
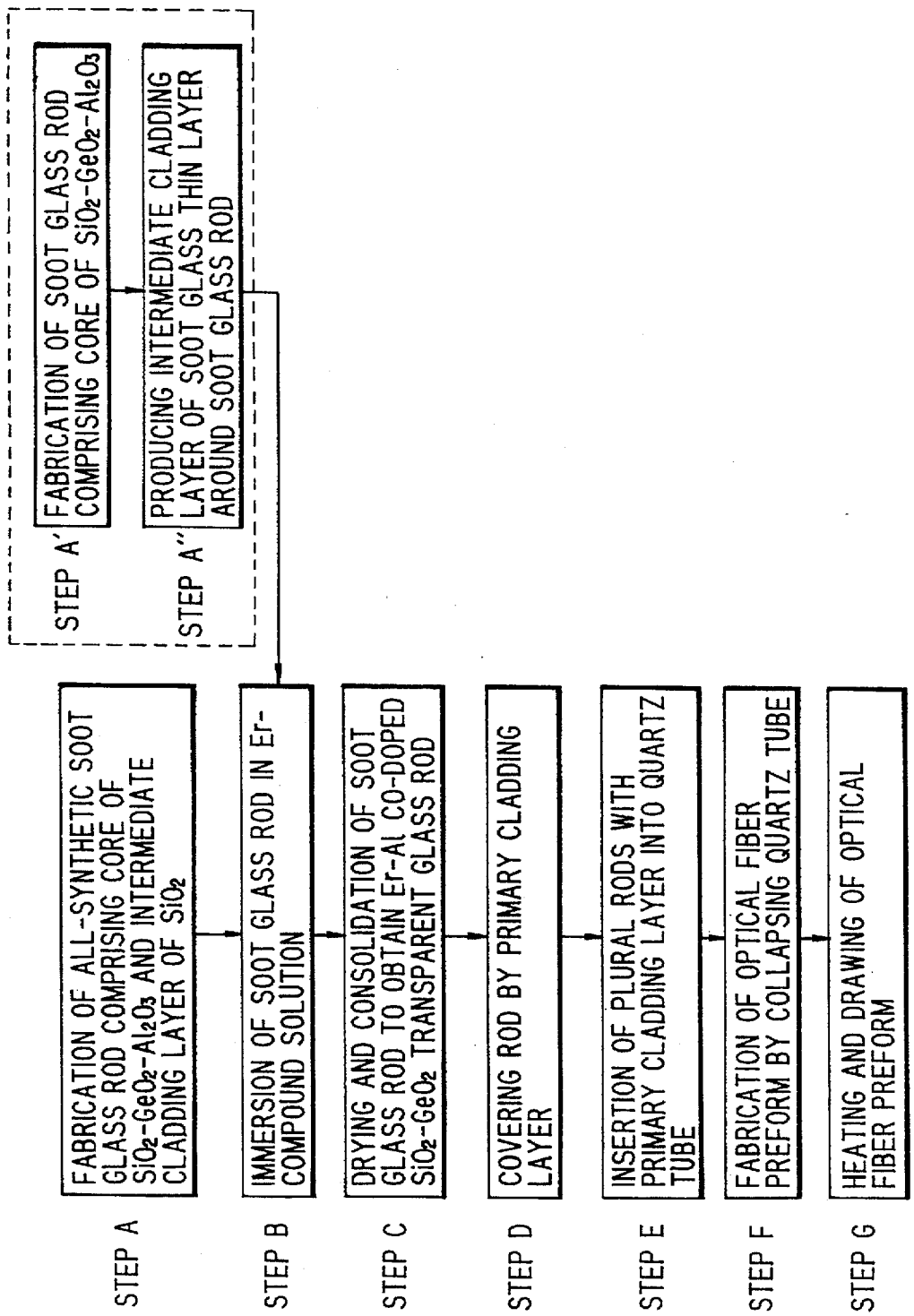
FIG. 9 is a flow chart showing a method for fabricating a rare earth element-doped multiple-core optical fiber in the second preferred embodiment according to the invention.

Next, a method for fabricating a rare earth element-doped multiple-core optical fiber in the second preferred embodiment according to the invention will be explain in FIG. 9. Soot glass rods comprising $SiO_2$—$GeO_2$—$Al_2O_3$ for cores and $SiO_2$ for intermediate cladding layers are fabricated by an All-synthetic process such as VAD method (at step A). Next, the soot glass rods are immersed in an Er-compound solution (at step B). Then the soot glass rods are picked up, dried and consolidated by an electrical heater to obtain Er—Al co-doped $SiO_2$—$GeO_2$ transparent glass rods with intermediate cladding layers (at step C). After that, each of the rods is covered by a primary cladding layer in an ordinary fabrication process such as outer CVD method (at step D). After that, in the same manner as in the method for fabricating the optical fiber in the first preferred embodiment, the plural rods are inserted into a quartz tube (at step E). The tube is heated and collapsed to fabricate an optical fiber preform rod (at step F), then, the optical fiber preform rod is heated and drawn to provide an Er-doped multiple-core optical fiber (at step G). Besides step A, in the same manner as in the method for fabricating the optical fiber in the first preferred embodiment, soot glass rods may be fabricated by two separate steps, as encircled by a broken line in FIG. 9. In this case, soot glass rods for Al-containing cores are fabricated (at step A'), and intermediate cladding layers of soot glass thin layers are produced around the soot glass rods (at step A"). Both steps may be processed by VAD method .

Figure 10:
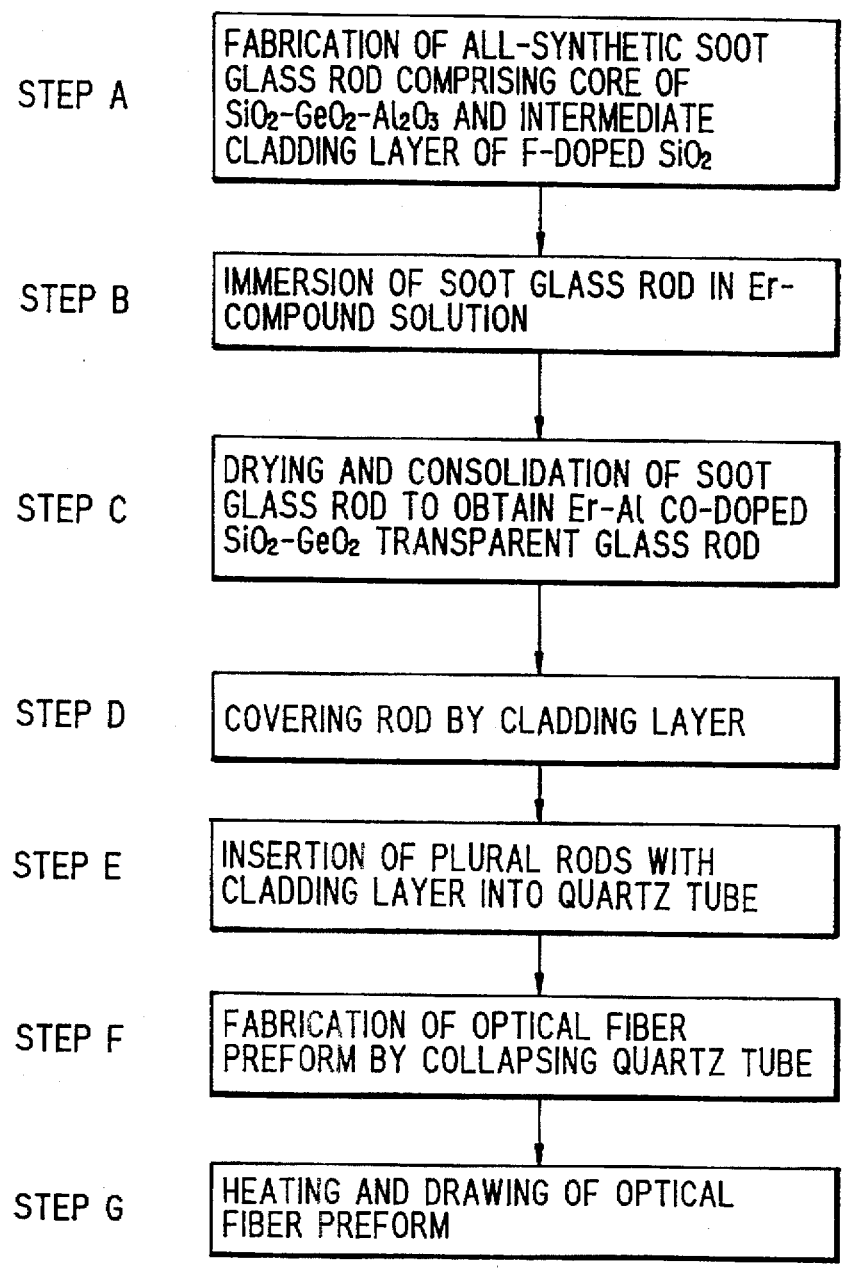
FIG. 10 is a flow chart showing another method for fabricating a rare earth element-doped multiple-core optical fiber in the second preferred embodiments according to the invention.

Another method for fabricating a rare earth element-doped multiple-core optical fiber in the second preferred embodiment according to the invention will be explained in FIG. 10. Especially in this case, intermediate cladding layers are made of F-doped $SiO_2$ (at step A). A step-shaped refractive index profile, which is shown in FIG. 7 (A), may be obtained by using a material such as F-doped $SiO_2$ for both primary cladding layers and an outer cladding layer, and a W-shaped refractive index profile, which is shown in FIG. 7 (B), may be obtained by using $SiO_2$ or Ge-doped $SiO_2$.

A variety of Er-doped multiple-core optical fibers are fabricated in the invention by the methods described before, and the characteristics of gain to core spacing are measured for optical fiber amplifiers. TABLE 1 shows structural parameters of such Er—Al co-doped multiple-core optical fibers according to the invention, together with an Er—Al co-doped multiple-core optical fiber which is formerly proposed by the inventors for comparison.

TABLE 1

| | | PRIOR EXAMPLE | EXAMPLE 1 (FIG. 6(A)) | EXAMPLE 2 (FIG. 6(B)) | EXAMPLE 3 (FIG. 7(A)) | EXAMPLE 4 (FIG. 7(B)) |
| --- | --- | --- | --- | --- | --- | --- |
| Er-CONCENTRATION (ppm) | | 400 | 400 | 400 | 400 | 400 |
| Al-CONCENTRATION (ppm) | | 8500 | 8500 | 8500 | 8500 | 8500 |
| CORE | REFRACTIVE INDEX | 1.4795 | 1.4795 | 1.4807 | 1.4795 | 1.4795 |
| | OUTER DIAMETER | 1.95 μm | 1.95 μm | 1.95 μm | 1.95 μm | 1.95 μm |
| INTER-MEDIATE CLADDING LAYER | REFRACTIVE INDEX | — | — | — | 1.458 | 1.447 (F-doped) |
| | THICKNESS | — | — | — | 0.35 μm | 0.35 μm |
| PRIMARY CLADDING LAYER | REFRACTIVE INDEX | 1.458 | 1.458 | 1.458 | 1.458 | 1.462 (Ge-doped) |
| | THICKNESS | 0.5 μm | 0.5 μm | 0.5 μm | 0.15 μm | 0.15 μm |
| OUTER CLADDING LAYER | REFRACTIVE INDEX | 1.458 | 1.458 | 1.458 | 1.458 | 1.462 (Ge-doped) |
| | OUTER DIAMETER | 125 μm | 125 μm | 125 μm | 125 μm | 125 μm |

Figure 4:
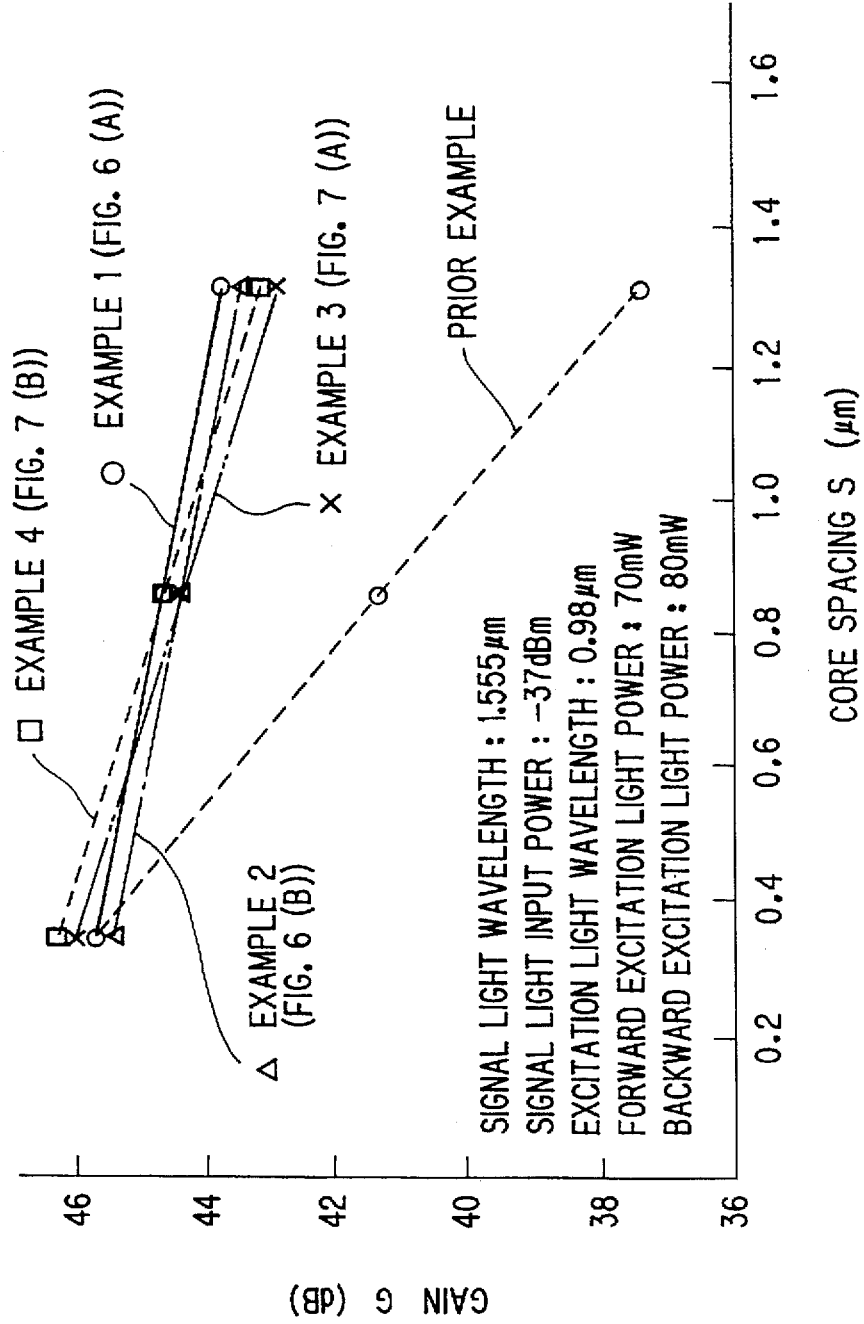
FIG. 4 is a graph showing the characteristics of gain to core spacing for rare earth element-doped multiple-core optical fibers according to the invention and a rare earth element-doped multiple-core optical fiber which is formerly proposed by the inventors.

The results are shown in FIG. 4, wherein a solid line is obtained for "EXAMPLE 1" in TABLE 1, a one-dotted line for the "EXAMPLE 2", a two-dotted line for the "EXAMPLE 3", and broken lines for the "EXAMPLE 4" and the "PRIOR EXAMPLE" are obtained, respectively. As the core spacing S is increased, a gain is drastically dropped for the "PRIOR EXAMPLE". On the contrary, gains are high and slight decreases are observed in the resptective examples of the invention. For example, in the Er—Al co-doped multiple-core optical fiber amplifier using the "EXAMPLE 1" fiber, a gain of 35 dB and a wavelength band width where gain drops by 1 dB from its maximum value ("1 dB band width") of 26 nm at an input signal light power of −17 dBm are obtained. In addition to that, a gain of 29 dB and a 1 dB band width of 51 nm at an input signal light power of −10 dBm are obtained. This band width is 1.5 to 2.2 times as wide as that obtained by the conventional Er-doped optical fiber amplifiers.

In the invention, a rare earth element-doped multiple-core optical fiber is not limited to an optical fiber having seven cores as shown in FIGS. 1 and 2, but may include optical fibers having a different number of cores such as three, nine, and nineteen cores.

As well explained above, the invention provides advantages set out below.

(1) a less gain drop occurs even if a spacing among the cores becomes larger. Therefore, an optical fiber amplifier by which a gain is kept high and widely flatter characteristics of gain to wavelength are obtained.

(2) an excitation light power is used effectively. Therefore, the power can be lower and a length of the optical fiber can be shorter.

(3) an rare earth element-doped multiple-core optical fiber having a high gain and wide wavelength band characteristics is fabricated precisely and economically.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A rare earth element-doped multiple-core optical fiber, comprising:

a plurality of cores each having a refractive index of $n_w$ doped with at least one rare earth element and Al therein;

a plurality of primary cladding layers each having a refractive index of np ($n_p<n_w$) doped with at least one rare earth element, and covering each of said cores; and an outer cladding layer having a refractive index of $n_c$ ($n_w>n_c$) and $n_p \leq n_c$), and covering said plurality of cores covered with said plurality of primary cladding layers;

wherein said cores are positioned substantially on a central axis of said outer cladding layer, and separated with a predetermined spacing by said plurality of primary cladding layers.

2. A rare earth element-doped multiple-core optical fiber, according to claim 1, wherein a number of said plurality of cores is seven, said predetermined spacing is 1.0 to 1.5 µm, a diameter of said outer cladding layer is 125 µm, and differences between specific refractive indices of said plurality of cores and said outer cladding layer, and between those of said plurality of cores and said plurality of primary cladding layers are at least 1%, respectively.

3. A rare earth element-doped multiple-core optical fiber, according to claim 1, wherein each of said plurality of cores is doped with a concentration of at least 200 ppm of said rare earth element and a concentration of at least 7000 ppm of Al, and each of said plurality of primary cladding layers is doped with a concentration of at least 50 ppm of said rare earth element.

4. A rare earth element-doped multiple-core optical fiber, according to claim 1, wherein a concentration of said rare earth element in each of said plurality of cores is distributed to be declined along its radial direction.

5. A rare earth element-doped multiple-core optical fiber, according to claim 1, wherein said rare earth element is Er.

6. A rare earth element-doped multiple-core optical fiber, comprising:

a plurality of cores each having a refractive index of $n_w$ doped with at least one rare earth element and Al therein;

a plurality of intermediate cladding layers each having a refractive index of $n_i$ ($n_i<n_w$) doped with at least one rare earth element, and covering said plurality of cores;

a plurality of primary cladding layers each having a refractive index of $n_p$ ($n_p \leq n_i$ and $n_p<n_w$) containing no rare earth element dopant, and covering said plurality of intermediate cladding layers; and an outer cladding layer having a refractive index of $n_c$ ($n_w>n_c$, $n_i \leq n_c$ and $n_p \leq n_c$), and covering said plurality of cores covered with said plurality of intermediate and primary cladding layers;

wherein said plurality of cores are positioned substantially on a central axis of said outer cladding layer, and separated with a predetermined spacing by said plurality of intermediate cladding layers.

7. A rare earth element-doped multiple-core optical fiber, according to claim 6, wherein a number of said plurality of cores is seven, said predetermined spacing is 1.0 to 1.5 µm, a diameter of said outer cladding layer is 125 µm, and differences between specific refractive indices of said plurality of cores and said outer cladding layer, and between those of said plurality of cores and said plurality of primary cladding layers are at least 1%, respectively.

8. A rare earth element-doped multiple-core optical fiber, according to claim 6, wherein each of said plurality of cores is doped with a concentration of at least 200 ppm of said rare earth element and a concentration of at least 7000 ppm of Al, and each of said plurality of intermediate cladding layers is doped with a concentration of at least 50 ppm of said rare earth element.

9. A rare earth element-doped multiple-core optical fiber, according to claim 6, wherein a concentration of said rare earth element in each of said plurality of cores is distributed to be declined along its radial direction.

10. A rare earth element-doped multiple-core optical fiber, according to claim 6, wherein each of said plurality of intermediate cladding layer is doped with said rare earth element and F together so as to provide a lower refractive index thereof than said plurality of primary cladding layers and said outer cladding layer.

11. A rare earth element-doped multiple-core optical fiber, according to claim 6, wherein said rare earth element is Er.

12. A method for fabricating a rare earth element-doped multiple-core optical fiber, comprising the steps of:

fabricating a plurality of soot glass rods, each of which is provided with a core having a refractive index of $n_w$ and containing Al, and a primary cladding layer having a refractive index of $n_p$ ($n_p<n_w$) and covering directly said core;

immersing said plurality of soot glass rods in an rare earth element compound solution;

picking up said plurality of soot glass rods from said solution, and drying and consolidating them to provide a plurality of rare earth element and Al co-doped transparent glass rods;

inserting said plurality of co-doped transparent glass rods into a quartz tube;

heating and collapsing said quartz tube thus inserted with said plurality of co-doped transparent glass rods to fabricate an optical fiber preform rod; and heating and drawing said optical fiber preform to provide an rare earth element-doped multiple-core optical fiber.

13. A method for fabricating a rare earth element-doped multiple-core optical fiber, comprising the steps of:

fabricating a plurality of soot glass rods for cores each having a refractive index of $n_w$ and containing Al;

producing primary cladding layers, having a refractive index of $n_p$ ($n_p<n_w$), of soot glass thin layers around each of said soot glass rods;

immersing said soot glass rods with said soot glass thin layers in an rare earth element-compound solution;

picking up said soot glass rods from said solution, and drying and consolidating them to provide a plurality of co-doped rare earth element-Al co-doped transparent glass rods;

inserting said plurality of co-doped transparent glass rods into a quartz tube;

heating and collapsing said quartz tube thus inserted with said plurality of co-doped rare earth element-Al co-doped transparent glass rode to fabricate an optical fiber preform rod; and heating and drawing said optical fiber preform rod to provide an rare earth element-doped multiple-core optical fiber.

14. A method for fabricating a rare earth element-doped multiple-core optical fiber, comprising the steps of:

fabricating a plurality of soot glass rods, each of which is provided with a core having a refractive index of $n_w$ and containing Al, and an intermediate cladding layer having a refractive index of $n_i$ ($n_i<n_w$) and covering directly said core;

immersing said plurality of soot glass rods in a rare earth element-compound solution;

picking up said plurality of soot glass rods from said solution, drying and consolidating them to provide a plurality of rare earth element and Al co-doped transparent glass rods;

covering each of said co-doped transparent glass rods by a primary cladding layer having a refractive index of $n_p$ ($n_p \leq n_i$ and $n_p<n_w$);

inserting said plurality of co-doped transparent glass rods with said intermediate cladding layers and said primary cladding layers into a quartz tube;

heating and collapsing said quartz tube to fabricate an optical fiber preform rod; and heating and drawing said optical fiber preform rod to provide an rare earth element-doped multiple-core optical fiber.

15. A method for fabricating a rare earth element-doped multiple-core optical fiber, comprising the steps of:

fabricating a plurality of soot glass rods for cores having a refractive index of $n_w$ and containing Al;

producing a plurality of intermediate cladding layers, having a refractive index of $n_i$ ($n_i<n_w$), of soot glass than layers around each of said soot glass rods;

immersing said plurality of soot glass rods with said soot glass thin layers in a rare earth element-compound solution;

picking up said plurality of soot glass rods from said solution, drying and consolidating them to provide rare earth element and Al co-doped transparent glass rods;

covering each of said plurality of glass rods by a primary cladding layer having a refractive index of $n_p$ ($n_p \leq n_i$ and $n_p<n_w$);

inserting said plurality of rods with said intermediate cladding layers and said primary cladding layers into a quartz tube;

heating and collapsing said quartz tube to fabricate an optical fiber preform rod; and heating and drawing said optical fiber preform rod to provide an rare earth element-doped multiple-core optical fiber.

* * * * *